United States Patent [19]
Gross et al.

[11] Patent Number: 6,128,734
[45] Date of Patent: *Oct. 3, 2000

[54] INSTALLING OPERATING SYSTEMS CHANGES ON A COMPUTER SYSTEM

[75] Inventors: Danny B. Gross, Bastrop; Michael D. O'Donnell, Austin; Gene R. Toomey, Kyle, all of Tex.

[73] Assignee: Advanced Micro Devices, Inc., Sunnyvale, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/785,491

[22] Filed: Jan. 17, 1997

[51] Int. Cl.$^7$ .................................................... G06F 9/445
[52] U.S. Cl. ................................. 713/100; 713/1; 713/2
[58] Field of Search ........................... 395/652, 182.11, 395/651, 653, 500, 680, 705, 183.14, 682, 683, 704, 186, 187.01, 200.33, 182.04, 200.57, 700, 712; 364/488, 489, 280, 578, 282.1, 284, 280.2, 280.9

[56] References Cited

U.S. PATENT DOCUMENTS

| | | | |
|---|---|---|---|
| 4,860,196 | 8/1989 | Wengert | 364/200 |
| 4,958,273 | 9/1990 | Andeson et al. | 364/200 |
| 5,142,680 | 8/1992 | Ottman et al. | 395/700 |
| 5,155,847 | 10/1992 | Kirouac et al. | 395/600 |
| 5,179,666 | 1/1993 | Rimmer et al. | 395/275 |
| 5,247,683 | 9/1993 | Holmes et al. | 395/700 |
| 5,325,532 | 6/1994 | Crosswy et al. | 395/700 |
| 5,421,009 | 5/1995 | Platt | 395/600 |
| 5,430,845 | 7/1995 | Rimmer et al. | 395/275 |
| 5,535,411 | 7/1996 | Speed et al. | 395/800 |
| 5,544,077 | 8/1996 | Hershey | 364/570 |
| 5,758,165 | 5/1998 | Shuff | 395/712 |

*Primary Examiner*—Ayaz R. Sheikh
*Assistant Examiner*—Tim Vo
*Attorney, Agent, or Firm*—Skjerven, Morill, MacPherson, Franklin & Friel, LLP; Stephen A. Terrile

[57] ABSTRACT

A computer system is upgraded while the computer system is functioning. The computer system has a first boot device with a first operating system and a second device. The method includes: preparing the second device within the computer system as a bootable device while the computer system is functioning under control of the first operating system; preparing the second device within the computer system to receive a second operating system while the computer system is functioning under control of the first operating system; loading the second operating system onto the second device while the computer system is functioning under control of the first operating system; and, rebooting the computer system such that the computer system is under control of the second operating system on the second device.

26 Claims, 7 Drawing Sheets

INSTALLING OPERATING SYSTEMS CHANGES ON A COMPUTER SYSTEM

BACKGROUND OF THE INVENTION

1. Field of the Invention

This invention relates to computer systems and, more particularly, to methods of upgrading computer systems.

2. Description of the Related Art

Computer systems have attained widespread use in providing computer power to many businesses and institutions. Computer systems are information handling systems which can be designed to give independent computing power to one user or a plurality of users. Some important applications in which computer systems have become common include general manufacturing monitoring and control; electronic, mechanical, and chemical system design and simulation; and network management and service. Productive processing time is of great importance to the users of these computer applications because system down time can result in significant costs.

In the design of a computer system, it is important to provide a degree of system availability that is necessitated by the applications for which the computer system is intended. System availability ranges from the ability of a system to remain functional in spite of failures in a portion thereof, to the minimization of a system's down-time in the event of a failure or necessary upgrade. High availability systems, as their name implies, are required to be available, or "on," virtually all of the time. For example, because many computer applications involve the use of network servers to provide processor power to multiple users, it is important that the network server be available as much as possible.

High availability computer systems must be able to restart as soon as possible after a system failure or upgrade. Frequent system upgrades or patches are often necessitated by the discovery of system errors or by the establishment of new system requirements. Unfortunately, operating system upgrades often require that the computer system be powered down or turned off. Also, computer system down time can occur as a result of an error or a failure during system setup during the upgrading procedure.

Commonly, when a computer system requires an upgrade, patches are made to the operating system of the computer system. Often, new patches are added to the patches from a previous system upgrade resulting in a large number of patches for each successive upgrade. The successful patches are then updated to other computer systems by replacing the present operating system of those computer systems with the new operating system including the successful patches. The new operating system is often installed from a storage device such as a tape drive to directly replace the present operating system needing the upgrade. Alternatively, the new operating system can be downloaded over a network.

Use of the method set forth above has certain consequences. Notably, using this method usually requires that the computer system be shut down. A backup of the present operating system usually must be made, and the upgrades or patches must be loaded while the computer system is down. Additionally, upgrades must often be made for multiple computer systems, causing down-time for all the systems involved. For example, in a network of servers, each server must be upgraded individually. That is, the system manager must power down a server, thereby limiting server availability by preventing user access, make a backup of the present operating system, load the new operating system, and test the new operating system. The system manager then repeats these actions for each of the other servers. The computer system being upgraded is usually down throughout the procedure, possibly for a period of hours. The cost for system downtime during these upgrades can be significant. Also, the chances for error or failure can be significant with this practice.

SUMMARY OF THE INVENTION

It has been discovered that an operating system may be upgraded by selecting and preparing a new boot device while the computer system is functioning, loading the new operating system onto the boot device while the computer system is functioning, and rebooting the computer system. Such a procedure advantageously allows the target system to be upgraded while minimizing the target system's resulting down time to that required for a target system reboot. Additionally, multiple target systems may be upgraded while minimizing the opportunities for operator error during each target system upgrade. Thus, the reliability and efficiency of making upgrades is improved with a simplified upgrade procedure that also reduces costs resulting from system upgrades.

In one embodiment of the present invention, a computer system is upgraded while the computer system is functioning. The computer system has a first boot device with a first operating system and a second device. The method includes: preparing the second device within the computer system as a bootable device while the computer system is functioning under control of the first operating system; preparing the second device within the computer system to receive a second operating system while the computer system is functioning under control of the first operating system; loading the second operating system onto the second device while the computer system is functioning under control of the first operating system; and, rebooting the computer system such that the computer system is under control of the second operating system on the second device.

In another embodiment of the present invention, a computer system is upgraded while the computer system is functioning. The computer system has a first boot device with a first UNIX operating system and a second device. The method includes: preparing the second device within the computer system as a bootable device while the computer system is functioning under control of the first UNIX operating system; preparing the second device within the computer system to receive a second UNIX operating system while the computer system is functioning under control of the first UNIX operating system; loading the second UNIX operating system onto the second device while the computer system is functioning under control of the first UNIX operating system; and, rebooting the computer system such that the computer system is under control of the second UNIX operating system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

The following sets forth a detailed description of the preferred embodiments. The description is intended to be illustrative of the invention and should not be taken to be limiting. Many variations, modifications, additions, and improvements may fall within the scope of the invention as defined in the claims which follow.

In the preferred embodiment, a target computer system is upgraded by selecting an alternate boot device attached to the target computer system and preparing it to boot the target computer system. An operating system from an already upgraded model computer system is loaded onto the alternate boot device of the target system. The upgrade becomes effective when the target system is rebooted using the alternate boot device.

Figure 1:
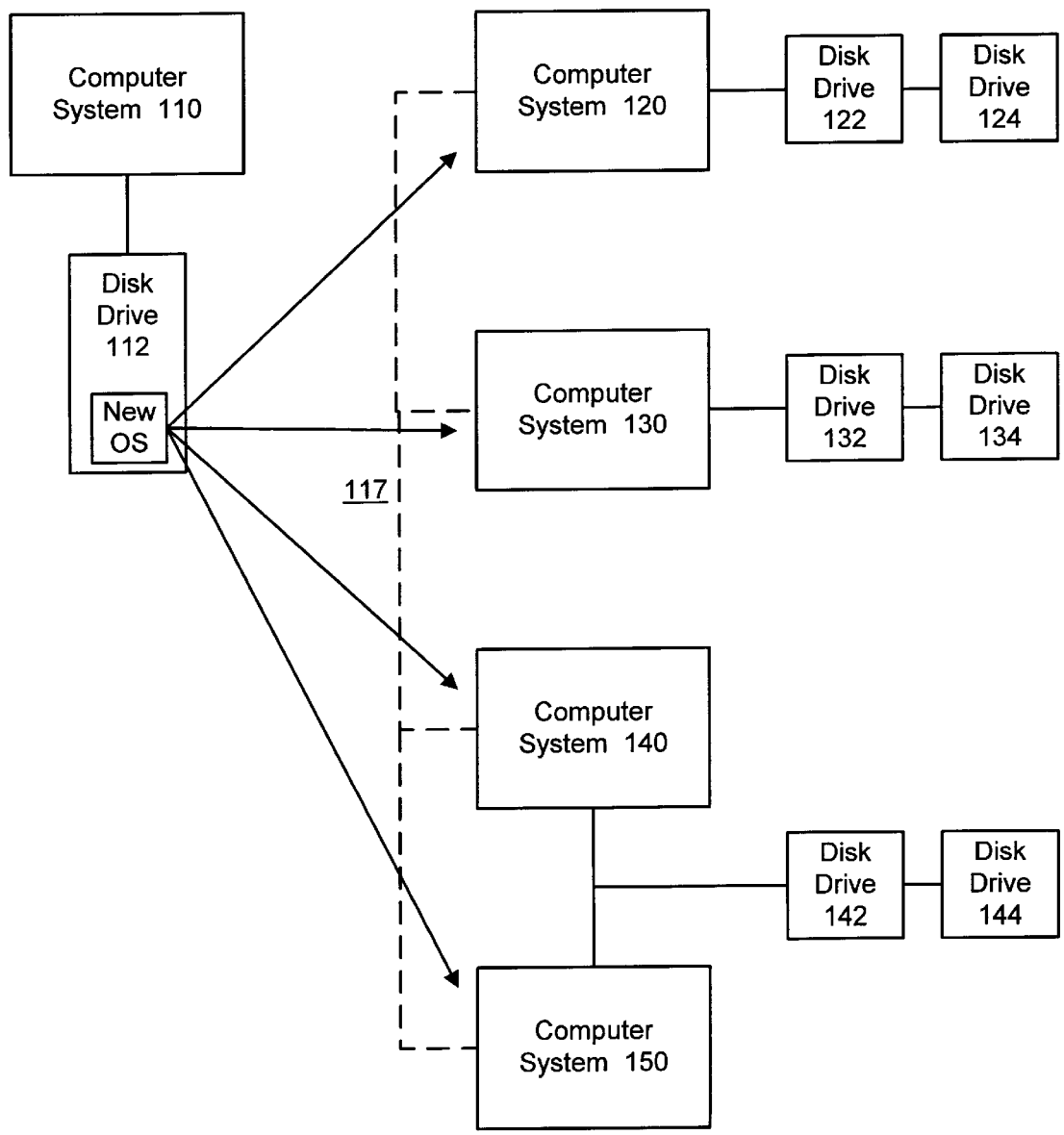
FIG. 1 shows a block diagram of a model computer system as well as a network of target computer systems according to an embodiment of the present invention.

Referring to FIG. 1, model computer system 110 and computer network 115 are shown. Model computer system 110 includes a disk drive 112. Computer network 115 includes computer systems 120, 130, 140, and 150 coupled via Ethernet connection 117. Computer system 120 includes disk drives 122 and 124. Computer system 130 includes disk drives 132 and 134. Computer systems 140 and 150 share disk drives 142 and 144.

In the preferred embodiment, computer systems 110, 120, 130, 140, and 150 are, e.g., Hewlett Packard Series 800 computer systems running the HPUX 9.04 type UNIX operating system. (UNIX is a trademark of UNIX Software Laboratories.) Such a computer system may function as a server for other computer systems. It is understood that other computer systems and other operating systems may be used in accordance with the invention. Additionally, in the preferred embodiment, the disk drives are connected to their respective computer systems in Small Computer System Interface (SCSI) chains. However, any appropriate connection means may be used in accordance with the invention.

Although computer systems 120, 130, 140, and 150 are coupled via Ethernet connection 117, any appropriate connection such as a fiber distributed data interface (FDDI) may be used. Alternatively, computer systems 120, 130, 140 and 150 may not be coupled at all. Also, although model computer system 110 is shown in the preferred embodiment to be disconnected from computer network 115, it is appreciated that model computer system 110 and computer network 115 could be coupled by an appropriate network connection in accordance with the invention.

Model computer system 110 is preferably a low-risk or low-use computer system selected to test initial upgrades which are then propagated to target computer systems 120, 130, 140, and 150. In the preferred embodiment, model computer system 110 is upgraded according to known techniques. A tape copy is made of certain key file systems for copying to each of the target computer systems 120, 130, 140, and 150. For example, on a UNIX-based system, the root (/) and usr file systems are copied.

Figure 2:
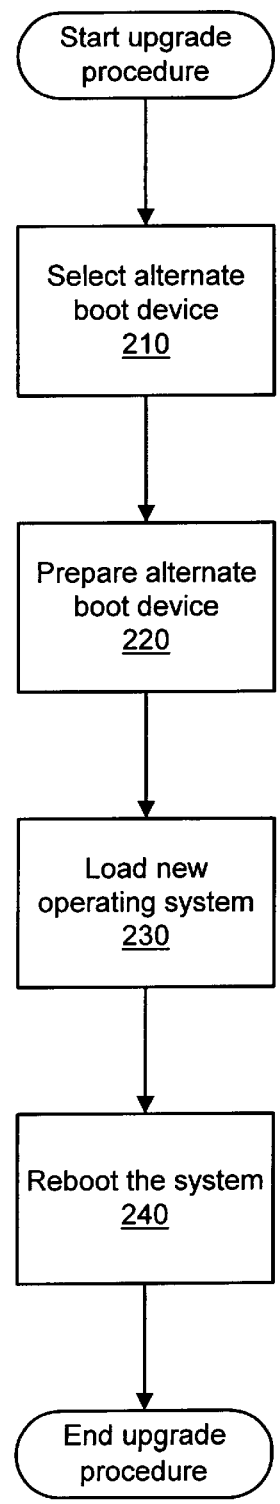
FIG. 2 shows a flow chart for upgrading an operating system according to an embodiment of the present invention.

Referring to FIG. 2, a flow chart for upgrading a target operating system is shown. At select step 210, the target upgrade procedure starts with an alternate boot device being selected on a target computer system. For example, target computer system 120 is on-line with disk drive 122 as the boot device containing the UNIX root (/) and usr files. Disk drive 124 is selected and prepared as the alternate boot device at select step 210. Although physical disk drive 124 is selected as the alternate boot device in the preferred embodiment, a logical boot device could also be selected. Control then transitions to prepare step 220. During prepare step 220, a separate volume group is created with disk drive 124. The volume group is prepared to receive the new operating system. Control then transitions to load step 230. During load step 230, the new operating system is loaded onto the prepared volume group. Steps 210, 220 and 230 are performed while target computer system 120 is on-line (i.e., is functioning so as to be available to perform other tasks in parallel with steps 210, 220 and 230). Control then transitions to reboot step 240. During reboot step 240, target computer system 120 is rebooted to load the new operating system.

Figure 3:
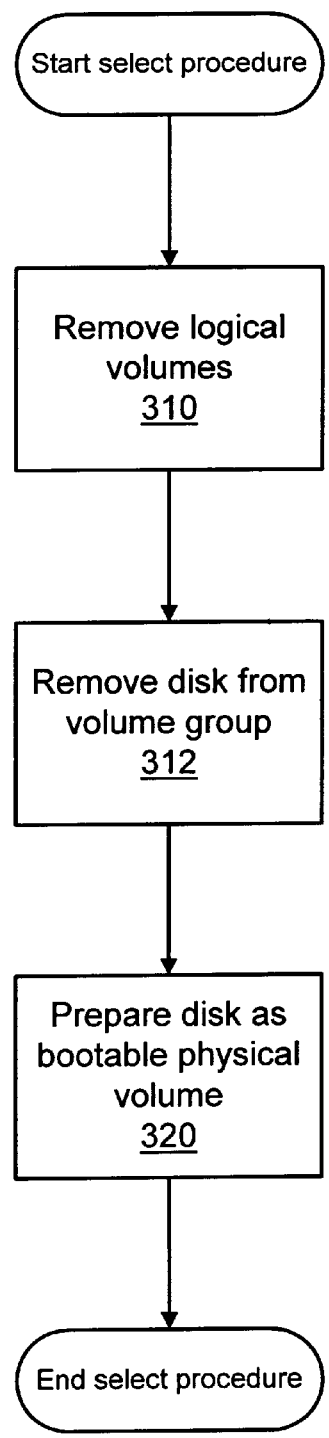
FIG. 3 shows a flow chart for selecting an alternative boot device according to an embodiment of the present invention.

Referring to FIG. 3, a flow chart for selecting the alternate boot device according to the preferred embodiment is shown. The following steps are performed while computer system 120 is on-line. At steps 310 and 312, disk drive 124 is selected as the alternate boot device. Specifically, at remove logical volumes step 310, a volume group is cleared of all logical volumes residing in the volume group on disk drive 124. For example, the following command removes the logical volume lvol1:

lvremove /dev/vgAPP/lvol1

Control then transitions to remove disk step 312. During remove disk step 312, disk drive 124 is removed from its volume group using, e.g., the following command:

vgreduce /dev/vgAPP /dev/dsk/disk_124

The vgreduce command removes the physical volume specified by disk_124 from the vgAPP volume group. Although disk drive 124 is used in the preferred embodiment, any type of physical or logical volume may be used in accordance with the invention. All logical volumes residing on disk drive 124 must be removed either by executing lvremove, or by some other relocation means, before executing vgreduce.

After the alternate boot device is selected during steps 310 and 312, control transitions to prepare boot step 320. During prepare boot step 320, disk drive 124 is prepared as a bootable physical volume using, e.g., the following commands:

pvcreate -Bf /dev/rdsk/disk_124
mkboot /dev/rdsk/disk_124

The pvcreate command initializes disk drive 124 for use as a physical volume in a volume group. Disk drive 124 is made a bootable disk by specifying the -B option which reserves space on disk drive 124 for boot related data. Designating disk drive 124 as a bootable device is a prerequisite for creating root volumes on logical volumes. The mkboot command installs boot programs on the device character special file /dev/rdsk/disk_124. Boot programs are stored in the boot area in logical interchange format (LIF), which is similar to a file system.

In the preferred embodiment, a device is identified, selected and prepared as an alternate boot device using the preferred UNIX commands. It is understood that the UNIX commands and options are exemplary and that equivalent commands in UNIX or another operating system may be used in accordance with the invention.

Figure 4:
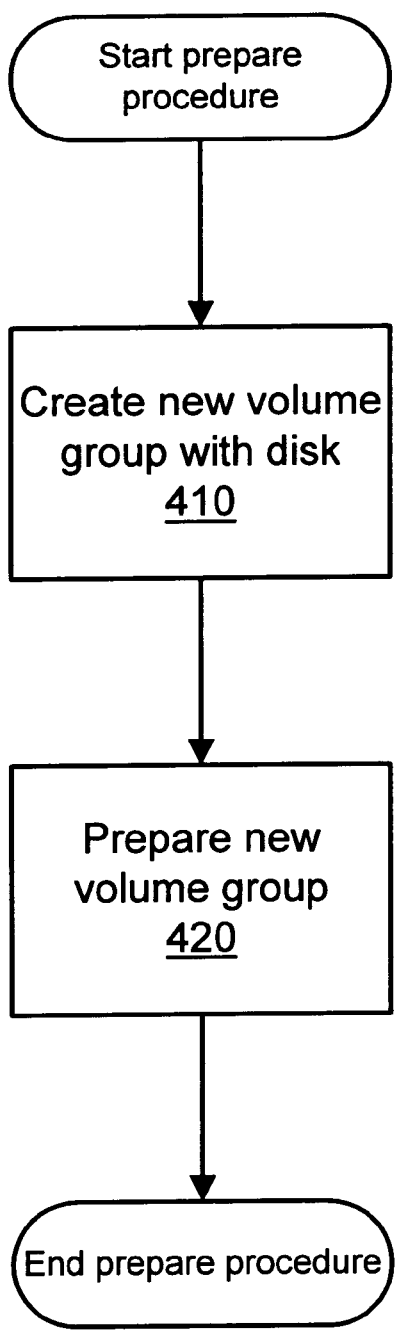
FIG. 4 shows a flow chart for preparing the alternative boot drive for the new operating system according to an embodiment of the present invention.

Referring to FIG. 4, a flow chart for preparing the alternate boot device to receive the upgraded operating system according to the preferred embodiment is shown. The following steps are performed while computer system 120 is on-line. At create volume group step 410, a new volume group is created with alternate boot disk drive 124. For example, the following UNIX commands create the new volume group:

mkdir /dev/vgROOT
        mknod /dev/vgROOT/group c 64 0x080000
        vgcreate /dev/vgROOT /dev/dsk/disk_124

The mkdir command creates a new directory named vgROOT. The mknod command prepares for the creation of the new volume group by creating a character device special file. The vgcreate command creates the new volume group named vgROOT.

Specifically, the mknod command creates a character device special file at/dev/vgROOT/group. Character device special files are used for devices that can transfer single bytes at a time, such as nine-track magnetic tape drives, disk drives operating in raw mode, and terminals. The second argument, c, indicates that the file group should be a character device special file. The third argument, 64, is a major device number. The major device number specifies the major device type (e.g., the device drive number). The fourth argument, 0x080000, is the minor device number. The minor device number specifies the device location. The minor device number is given in hexadecimal form in the above exemplary command. Assignment of major and minor device numbers is specific to each HP-UX system.

The vgcreate command creates a new volume group named vgROOT. The name vgROOT is a symbolic name for the volume group and must be used in all references to it. The first argument, /dev/vgROOT, is the path to a directory entry under /dev which must contain a character special file named group. Except for the group entry, the vgROOT directory should not contain any other entries. The second argument /dev/dsk/disk_124 provides the physical volume path.

Figure 5:
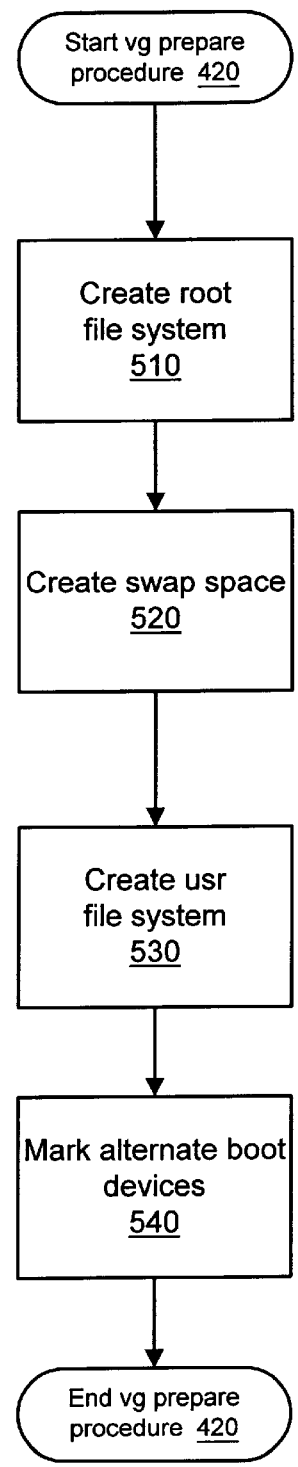
FIG. 5 shows a flow chart for preparing a volume group according to an embodiment of the present invention.

After create volume group step 410, control transitions to prepare volume group step 420. During prepare volume group step 420, the root (/), swap and usr alternate boot file systems are created. Referring to FIG. 5, a flow chart for preparing the volume group according to the preferred embodiment is shown.

During create root step 510, the root file system is created using, e.g., the following commands:

lvcreate -d p -l 64 -C y -r n -s y /dev/vgROOT
        newfs /dev/vgROOT/rlvol1 disk_type The lvcreate command creates a logical volume within the volume group specified by /dev/vgROOT. Because the logical volume path is not specified, the lvcreate command creates a new logical volume with a system generated name of the form lvolN, where N is the minor number of the new logical volume starting with minor number 1. The logical volume lvol1 is the new logical volume for the root file system of alternate boot disk drive 124.

Options are used to tailor the new logical volume to the requirements of the system. For example, the schedule option, -d, sets a parallel scheduling policy (to prevent performance degradation) when one logical extent with more than one mirror (physical extent) is written. (An extent is a continuous block of storage space on a disk or direct-access storage device reserved by the operating system for a particular file or program.) The option -l followed by the logical extents number 64 allocates 64 logical extents to the logical volume path /dev/vgROOT/lvol1. The contiguous option -C y sets a contiguous allocation policy. A contiguous logical volume has three characteristics: physical extents are allocated in ascending order; no gap is allowed between physical extents within a mirror copy; and, physical extents of any mirror copy all reside in a single physical volume. The strict option -s y sets a strict allocation policy so that mirrors for a logical extent cannot share the same physical volume. The contiguous and strict options, -C and -S, are used together to form various combined allocation policies on a logical volume. For example, -s y and -C y creates a logical volume such that each mirror copy is contiguous, yet mirror copies of a logical extent cannot share the same physical volume. The option -r n sets the bad block relocation policy to prevent bad block relocation from occurring.

The newfs command constructs a new file system. The first argument specifies a character special file for the disk. The second argument specifies the type of disk as specified in /etc/disktab. The file disktab contains disk geometry and file system section information. The new file system is the file system for the root (/) file system of alternate boot disk drive 124.

Control then transitions to create swap space step 520. During create swap space step 520, the swap space is created using, e.g., the following command:

lvcreate -d p -l 25 -C y -r n -s y -M n -c n /dev/vgROOT

As above, the lvcreate command creates a logical volume within the volume group specified by /dev/vgROOT. Because the logical volume path is not specified, the lvcreate command creates a new logical volume with a system generated name of the form lvolN, where N is the minor number of the new logical volume, in this case, 2. The volume group lvol2 is the new volume group for the swap space of alternate boot disk drive 124.

Lvcreate schedule option, -d, sets a parallel scheduling policy. The option -l followed by the logical extents number 25 allocates 25 logical extents to the logical volume path /dev/vgROOT/lvol2. The contiguous and strict options, -C y and -s y, create a logical volume such that each mirror copy is contiguous, yet mirror copies of a logical extent cannot share the same physical volume. The option -r n prevents bad block relocation from occurring. The mirror write cache option -M n turns off the mirror write to cache. That is, writes to a mirror copy are not recorded in the mirror consistency record under the volume group reserved area on the disk. The mirror consistency record tracks identicality of mirror records for performing mirror consistency recovery. The mirror consistency option -c n turns off mirror consistency recovery.

Control then transitions to create usr file system step 530. During create usr file system step 530, the usr file system is created using, e.g., the following commands:

lvcreate -l 128 /dev/vgROOT
        newfs /dev/vgROOT/r1vol3 disk_type

The lvcreate command creates the new volume group for the usr file system of alternate boot disk drive 124 within the volume group specified by /dev/vgROOT. Because the logical volume path is not specified, the lvcreate command creates a new logical volume lvol3. The option -l followed by the logical extents number 128 allocates 128 logical extents to the logical volume path /dev/vgROOT/lvol3.

The newts command constructs a new file system. The first argument specifies a character special file for the disk.

The second argument specifies the type of disk as specified in /etc/disktab. The new file system is the file system for the usr file system of alternate boot disk drive 124.

Control then transitions to mark step 540. During mark step 540, the alternate boot device file systems (root, swap, and usr) are marked using, e.g., the following commands:

lvlnboot −r /dev/vgROOT/lvol1
lvlnboot −s /dev/vgROOT/lvol2
lvlnboot −v

Generally, the lvlnboot command updates all physical volumes in the volume group such that the logical volume becomes the root, primary swap, or a dump volume when the system is next booted on the volume group. The above exemplary lvlnboot commands inform target system 120 of the locations of the root (/) file system and the swap space on disk drive 124 so that target system 120 can be booted from disk drive 124.

Specifically, the first lvlnboot −r command defines /dev/vgROOT/lvol1 to be the root volume when the system is booted on this volume group. The −r option updates the boot data reserved area so target system 120 uses the volume group to locate the root file system. This allows root logical volume lvol1 to be used as the root volume during a maintenance mode boot. (The physical volume or volumes containing lvol1, here disk drive 124, must have been "created" using the pvcreate −B option, indicating that disk drive 124 is to be used as a bootable physical volume. Also, the mkboot command must have been run on disk drive 124 to create the LIF area at the top of disk drive 124.) Root volume lvol1 must be a contiguous logical volume (i.e., it cannot have bad block relocation enabled).

The second lvlnboot −s command defines lvol2 to be the primary swap volume the next time the system is booted on the volume group. The −s option updates the boot data reserved area and removes any existing swap areas previously defined. Swap volume lvol2 must be a contiguous logical volume, and a root logical volume must have been previously defined by use of the lvlnboot command, as in the preferred embodiment.

The third lvinboot −v command prints verbose messages on all volume groups to verify that the alternate boot device 124 has been properly selected and prepared as the next boot device.

Figure 6:
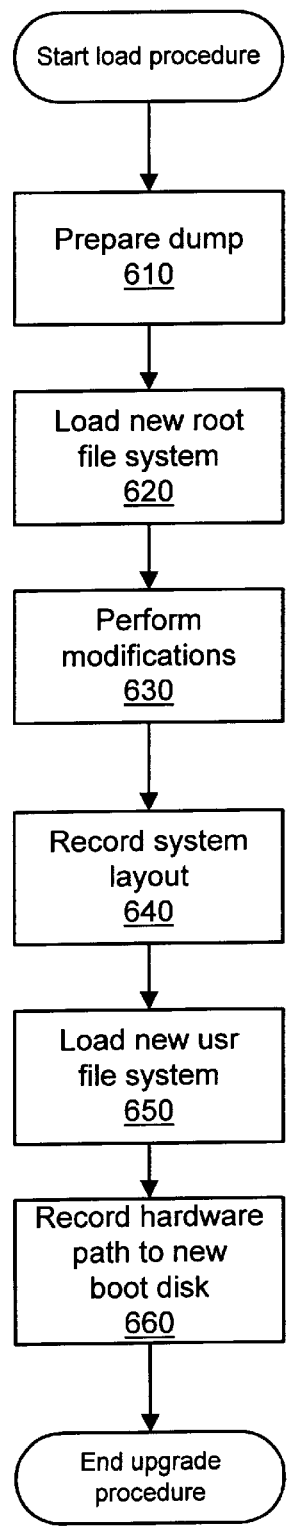
FIG. 6 shows a flow chart for loading the new operating system according to an embodiment of the present invention.

Referring to FIG. 6, a flow chart for loading the new operating system onto the prepared volume group of target computer system 120 according to the preferred embodiment is shown. The following steps are performed while target computer system 120 is on-line.

At prepare dump step 610, a copy of the previously patched key file systems of computer system 110 is prepared. Prepare dump step 610 can be performed at any time prior to load root step 620. In the preferred embodiment, a single dump tape is prepared by dumping the root (/) and usr file systems of model computer system 110 using the following commands, respectively:

dump 0sf 145000 /dev/rmt/0mn /dev/vg00/rlvol1
dump 0sf 145000 /dev/rmt/0mn /dev/vg00/rlvol3

The above dump commands copy all files in the specified root (/) and usr file systems, respectively, to a magnetic tape. The first argument, 0sf, specifies the options for the dump command. The 0 option specifies that the entire file system is to be dumped. The s option specifies that the next argument, 145000, specifies the size of the dump tape in feet. The f option specifies that an argument follows specifying the location of the tape drive. The third argument, /dev/rmt/0mn, specifies the location of the tape drive. The fourth arguments of each command specify that the source of the root (/) file system is /dev/vg00/rlvol1 and that the source of the usr file system is /dev/vg00/rlvol3, respectively. Although a dump tape is prepared in the preferred embodiment, any appropriate method of copying the key file systems may be used, including, e.g., transmittal over a network.

Control then transitions to load root step 620. During load root step 620, the dump tape is mounted on target computer system 120, and the root file system copied from model computer system 110 is loaded onto target computer system 120. In the preferred embodiment, the following commands are used:

mt −t /dev/rmt/0mn rew
mount /dev/vgROOT/lvol1 /mnt
cd /mnt
restore rf /dev/rmt/0mn The mt command (magnetic tape manipulating program) gives commands to the tape drive. The name of the tape drive is specified by −t /dev/rmt/0mn, the default tape interface. The argument, rew, commands the tape associated with the device file /dev/rmt/0mn to rewind. The mount command indicates that a removable file system is to be attached to the file tree at directory /mnt. Directory /mnt must already exist. Directory /mnt becomes the name of the root of the newly mounted file system. The special root file to be attached to /mnt is specified by /dev/vgROOT/lvol1. The cd command changes the active directory to /mnt. The restore command reads tapes dumped with the dump command. With the r option, the tape is read and loaded into the current directory /mnt. The option r is used only to restore a complete dump tape onto a clear file system or to restore an incremental dump tape after a full-level zero restore. Thus, the root file system is restored from the dump tape. The option f indicates that the name of the archive is specified in an argument, i.e., /dev/rmt/0mn.

Control then transitions to modify step 630. During modify step 630, any configuration files for the new system are modified if required. For example, in the preferred embodiment, the name of the system must be changed from that of model system 110 to that of model system 120 by modifying the file /mnt/etc/src. sh which defines the system name. Also, the following files are modified in the preferred embodiment: the file /mnt/etc/netlinkrc ensures that the appropriate network links are enabled; the file /mnt/etc/hosts adds the system internet protocol (IP) address; the file /mnt/etc/defaultrouter adds the router IP address; the file /mnt/etc/defaulthostname changes the host's name; the files /mnt/etc/defaultmask and /mnt/etc/defaultbroadcast define the class of addresses (network specific links); and, the files /mnt/etc/issue and /mnt/etc/motd optionally provide information to the system users.

Control then transitions to record step 640. Record step 640 is optional, so control may optionally transition to load usr step 650. During record step 640, the system layout and logical volume manager layout are recorded for safety purposes. For example, the following command scans the target computer system 120 kernel input/output (I/O) system data structures and lists the results:

ioscan −fk> ioscan.fil

The −f option causes the ioscan command to produce a full listing. For example, the command outputs the module's class, hardware path, module path, any logical unit, and hardware and software status values. The information is placed in the file ioscan. fil. Also, the following command displays information about all volume groups:

vgdisplay −v> vgdisplay.fil

The −v option lists the name, status, etc., for each logical volume, for each physical volume and for each physical volume group in the volume group. The lists are placed in the file vgdisplay.fil.

Control then transitions to load usr step 650. During load usr step 650, the usr file system is mounted and the target operating system build procedure is completed. In the preferred embodiment, the following commands are used:

umount /mnt
  mount /dev/vgROOT/lvol3 /mnt
    cd /mnt
    restore rf /dev/rmt/0mn
  umount /mnt The command umount unmounts the root file system lvol1 from /mnt. (The root file system was mounted during load root step 620.) The mount command indicates that a removable file system is to be attached to the file tree at directory /mnt, which becomes the name of the root of the newly mounted file system. The special file to be attached to /mnt is specified by /dev/vgROOT/lvol3. The cd command changes the active directory to /mnt. The restore command restores the usr file system dumped to the tape.

Control then transitions to record hardware path step 660. During record hardware path step 660, the hardware path to the new boot disk is recorded using, e.g., the command:

ioscan –fC disk

The machine specific hardware address of the new drive is thus identified. The upgrade procedure is has prepared target computer system 120 to be rebooted with the new boot disk drive 124.

Figure 7:
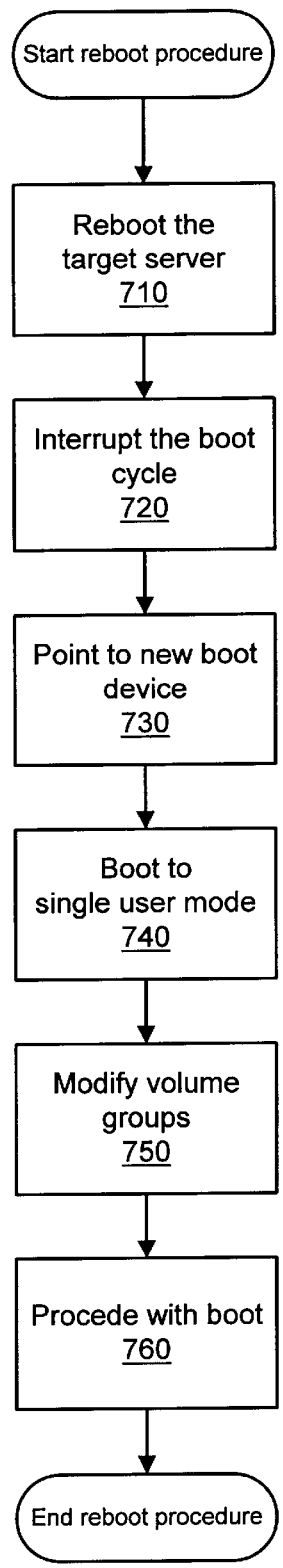
FIG. 7 shows a flow chart for rebooting the system according to an embodiment of the present invention.

Referring to FIG. 7, a flow chart for rebooting target computer system 120 according to the preferred embodiment is shown. During reboot step 710, target computer system 120 is rebooted using new boot disk drive 124. The reboot may occur at any time. Control then transitions to boot interrupt step 720. During boot interrupt step 720, the boot cycle is interrupted. Control then transitions to point step 730. During point step 730, the system is directed to disk drive 124 for booting. For example, the machine hardware address recorded during record hardware path step 660 is entered when the system prompts the user for the boot path and for the "primpath," or the primary path. Control then transitions to single user boot step 740. During single user boot step 740, the system is booted to the single user mode using, e.g., the following command:

hpux –lm (;0)/hp-ux

Control then transitions to modify step 750. During modify step 750, the boot volume group is modified at the single user prompt to make the boot volume group specific to target computer system 120. For example, the following commands were used to modify the boot volume group:

vgexport /dev/vg00
mkdir /dev/vg00
  mknod /dev/vg00/group c 64 0x0000
vgimport /dev/vg00 /dev/dsk/disk_124

The vgexport command removes the volume group /dev/vg00 from the system without modifying the logical volume information on the physical volume. Specifically, /dev/vg00 is removed from the /etc/lvmtab file. The associated device files including the /dev/vg00 directory and the group file are removed from the system. The volume group information and data is untouched on the physical volume. The mkdir command creates a new directory named vg00 at /dev. The mknod command prepares for the creation of the new volume group by creating a character device special file at /dev/vg00/group. As mentioned, character device special files are used for devices that can transfer single bytes at a time, such as magnetic tape drives, disk drives operating in raw mode, and terminals. The vgimport command adds the volume group /dev/vg00 to the system. The specified physical volume /dev/dsk/disk_124 is scanned to obtain the volume group information and logical volume information. This command works like the vgcreate command by requiring that the volume group device directory and group special file be created before the command is executed. The volume group /dev/vg00 is added to the /etc/lvmtab file, and the associated logical volume device files are added to the system. The vgimport command assumes that the volume group information has already been created on the physical volumes.

As a safety precaution, the same operations may be conducted with each of the other volume groups. The vgdisplay.fil created at optional record step 640 may be referenced to complete the operation.

Control then transitions to reboot proceed step 750. During reboot proceed step 750, the reboot of target computer system 120 may be continued. Alternatively, target computer system 120 may be rebooted. In the preferred embodiment, target computer system 120 is rebooted.

The procedure set forth above is then repeated for target computer systems 130, 140, and 150 so that all computer systems are upgraded with the new operating system.

While the invention has been described with reference to various embodiments, it will be understood that these embodiments are illustrative and that the scope of the invention is not limited to them. Many variations, modifications, additions, and improvements of the embodiments described are possible. Those skilled in the art will recognize that the UNIX commands and options of the preferred embodiment are exemplary and that other commands and options of UNIX, or commands of other operating systems, may be used in accordance with the invention. Modifications to the above series of commands will be apparent to those skilled in the art. These and other variations, modifications, additions, and improvements may fall within the scope of the invention as defined in the claims which follow.

What is claimed is:

1. In a first computer system responding to users under control of a first operating system, a method for upgrading the first computer system while the first computer system continues to function under control of the first operating system, the first computer system having a first boot device storing the first operating system and a second device, the method comprising:

preparing the second device within the first computer system as a bootable device while the first computer system is functioning under control of the first operating system;

preparing the second device within the first computer system to receive a second operating system while the first computer system is functioning under control of the first operating system;

loading the second operating system onto the second device while the first computer system is functioning under control of the first operating system; and rebooting the first computer system such that the first computer system is functioning under control of the second operating system on the second device, the first operating system being unmodified during the first computer system upgrading, wherein the first computer systems continues to respond to users during the upgrading.

2. The method of claim 1, wherein the step of preparing the second device as a bootable device comprises:

initializing the second device;

designating the second device as a boot device by reserving space on the second device for boot related data; and installing boot programs onto the second device.

3. The method of claim 1 wherein the second device is a logical storage device.

4. The method of claim 1, wherein the first operating system is a UNIX-based operating system, the first computer system includes a volume group, the second device is within the volume group, and the preparing step including:

removing all logical volumes from the volume group;

removing the second device from the volume group;

initializing the second device as a volume in a volume group;

designating the second device as a boot device by reserving space on the second device for boot related data; and installing boot programs onto the second device.

5. The method of claim 1 further comprising:

upgrading the first operating system on a second computer to form the second operating system, wherein the upgrading is performed before the loading of the second operating system onto the second device.

6. The method of claim 1, wherein the step of loading the second operating system comprises one of the following steps:

copying the second operating system from a second computer system; and moving the second operating system from a second computer system.

7. The method of claim 1, wherein the first computer system operates under control of a UNIX-based operating system, the UNIX-based operating system including a root file system, a usr file system and configuration files, and the loading step further comprises:

preparing a dump device with the second operating system;

mounting the root file system of the dump device on the first computer system;

restoring the root file system;

modifying the configuration files;

mounting the usr file system; and restoring the usr file system.

8. The method of claim 1, wherein the first computer system operates under control of a UNIX-based operating system.

9. The method of claim 2, wherein the initializing step includes at least one of the following steps:

erasing all files on the second device;

erasing all files and directories on the second device;

designating a previously initialized device as the second device; and formatting the second device to store information so that it is accessible by the first computer system.

10. The method of claim 6, wherein the step of copying the second operating system comprises at least one of the following steps:

copying the second operating system over a network of computer systems;

copying the second operating system from the second computer system to a dump device and then copying the second operating system from the dump device to the first computer system.

11. The method of claim 7, wherein the loading step further comprises:

recording the layout of the first computer system after the root file system and the usr file system have been restored.

12. In a first computer system providing response to users under control of a first UNIX-based operating system, a method for upgrading a first computer system while the first computer system continues to function under control of the first UNIX-based operating system, the first computer system having a first boot device storing the first UNIX-based operating system and a second device, the method comprising:

preparing the second device within the first computer system as a bootable device while the first computer system is functioning under control of the first UNIX-based operating system;

preparing the second device within the first computer system to receive a second UNIX-based operating system while the first computer system is functioning under control of the first UNIX-based operating system;

loading the second UNIX-based operating system onto the second device while the first computer system is functioning under control of the first UNIX-based operating system; and rebooting the first computer system such that the first computer system is functioning under control of the second UNIX-based operating system on the second device, the first UNIX-based operating system being unmodified during the upgrading, wherein the first computer system continues to provide response to users during the upgrading.

13. The method of claim 12, wherein the first computer system includes a volume group, the second device being within the volume group, and the step of preparing the second device as a bootable device comprises:

removing all logical volumes from the volume group;

removing the second device from the volume group;

initializing the second device as a volume in a volume group;

designating the second device as a boot device by reserving space on the second device for boot related data; and installing boot programs onto the second device.

14. The method of claim 12, wherein the step of preparing the second device to receive the second UNIX-based operating system comprises:

creating a new volume group with the second device;

creating a root file system on the second device;

creating a swap space on the second device;

creating a usr file system on the second device; and marking the root file system and the swap space on the second device so that the first computer system can be booted from the second device.

15. The method of claim 12, wherein each of the first and second UNIX-based operating systems includes a root file system and a usr file system, and the loading step comprises:

preparing a dump device with the second operating system;

mounting the root file system of the dump device on the first computer system;

restoring the root file system;

mounting the usr file system; and restoring the usr file system.

16. The method of claim 12, wherein the step of loading the second UNIX-based operating system comprises one of the following:

copying the second UNIX-based operating system from a second computer system; and moving the second UNIX-based operating system from a second computer system.

17. The method of claim 12, wherein the step of rebooting the first computer system comprises:

initiating the reboot of the first computer system such that the first computer system is under control of the first UNIX-based operating system on the first device;

interrupting the reboot of the first computer system;

pointing to the second device;

booting to single user mode;

modifying the volume group if required; and proceeding with the reboot.

18. The method of claim 12 further comprising:

patching the first UNIX-based operating system on a second computer system to form the second UNIX-based operating system, wherein the patching is performed before the loading of the second UNIX-based operating system onto the second device.

19. The method of claim 12 wherein the second device is a logical storage device.

20. The method of claim 14, wherein the step of creating the new volume group with the second device comprises:

creating a new directory;

creating a character device special file in the new directory to prepare for the creation of a new volume group; and creating the new volume group at the new directory with the second device.

21. The method of claim 15, wherein each of the first and second UNIX-based operating systems including configuration files, and the loading step further includes modifying the configuration files.

22. The method of claim 15 wherein the loading step further comprises:

recording the layout of the first computer system after the root file system and the usr file system have been restored.

23. The method of claim 16, wherein the step of copying the second UNIX-based operating system comprises at least one of the following:

copying the second UNIX-based operating system from the second computer system coupled to the first computer system;

copying the second UNIX-based operating system from the second computer system to a dump device and then copying the second UNIX-based operating system from the dump device to the first computer system.

24. The method of claim 20, wherein the step of creating the root file system on the second device comprises:

creating a root logical volume within the new volume group; and creating the root file system within the new volume group.

25. The method of claim 20, wherein the step of creating the swap space on the second device comprises:

creating a swap logical volume within the new volume group.

26. The method of claim 20, wherein the step of creating the usr file system on the second device comprises:

creating a usr logical volume within the new volume group; and creating the usr file system within the new volume group.

* * * * *